United States Patent [19]
Ekstrand

[11] 3,942,901
[45] Mar. 9, 1976

[54] OPTICAL SIGHTING INSTRUMENT WITH MEANS FOR PRODUCING A SIGHTING MARK

[76] Inventor: John Arne Ingemund Ekstrand, Drottninggatan 72 A, 252 21 Helsingborg, Sweden

[22] Filed: Dec. 7, 1973

[21] Appl. No.: 422,763

[30] Foreign Application Priority Data
Mar. 26, 1973 Sweden .............................. 7304185

[52] U.S. Cl. ................................. 356/251; 356/252
[51] Int. Cl.² ......................................... G02B 23/10
[58] Field of Search ........... 356/247, 251, 252, 253, 356/254, 255; 350/174

[56] References Cited
UNITED STATES PATENTS

| | | | |
|---|---|---|---|
| 2,780,130 | 2/1957 | Mauer | 356/251 |
| 3,362,074 | 1/1968 | Luebkeman et al. | 356/247 |
| 3,565,539 | 2/1971 | Russa | 356/251 |
| 3,589,796 | 6/1971 | Schaefer | 350/174 |
| 3,813,790 | 6/1974 | Kaltmann | 356/252 |

*Primary Examiner*—Vincent P. McGraw
*Attorney, Agent, or Firm*—Victor J. Evans & Co.

[57] ABSTRACT

An optical instrument comprising a lens means having a concave light reflecting surface serving as a semi-transparent mirror, and a light source for directing light beams to the semi-transparent mirror which is arranged to produce an image of the light source, such that said image to an observer who has his eye directed to the concave mirror surface appears to lie far in front of the mirror to serve as a sighting mark on a sighting line between the observer's eye and a target; the lens means with the semi-transparent concave mirror surface and the light source being arranged such in relation to each other and in relation to the sighting line that the optical main axis from the light source to the lens means intersects the sighting line substantially on the semi-transparent mirror surface and intersects the theoretical optical main axis of the lens means in a point situated close to the focus of the concave mirror surface, and such that the focus and said point are transversely spaced from the sighting line whereby sighting errors as a result of misalignment of the observer's eye in relation to said sighting line will be reduced to a minimum.

15 Claims, 7 Drawing Figures

OPTICAL SIGHTING INSTRUMENT WITH MEANS FOR PRODUCING A SIGHTING MARK

This invention relates to an optical sighting instrument which comprises a lens means adapted to serve as a semi-transparent concave mirror, and a light source so arranged that the mirror gives to the observer's eye an image of the light source which serves as a sighting mark.

In an instrument of this kind which is known from French Pat. No. 1,126,409 use is made, as a light source, of a fluorescent rod of glass or plastic which is adapted to have its circumference illuminated by ambient light or by light from an auxiliary light source and is arranged to emit light through its one end which is directed to the mirror. Both ends of the rod are silvered or otherwise closed to light emission except for an aperture in the form of a reticle in the silver layer at the end of the rod directed to the mirror, and the rod can be adjusted relative to the mirror to allow placing the reticle in the focus of the concave mirror surface.

With this instrument the mirror image of the light source will be perceived by the observer as a sighting mark situated at a great distance in front of the mirror and the observer will be able to move his eye in a zone corresponding to the field of the mirror without any parallax error occurring between the image of the reticle and the target area, which makes it possible to place a small filter between the observer's eye and the target and to observe or aim at the target optionally through the filter or directly above or below the filter.

In order that no parallax error or double image shall arise the light source being reflected shall be a point or surface (one- or two-dimensional), i.e. all light shall appear as if it arrived from the reticle proper. This is not, however, the case in the previously known instrument described, for the light emitted from the reticle does not appear to come from one and the same plane, i.e. the plane of the reticle, but also from the rear end of the rod and from several points within the rod proper. The rod is not either totally reflecting, for all light rays within the rod that are incident to the peripheral surface of the rod at angles outside a total inner reflection, are emitted from the rod with consequent weakening of the light.

The previously known instrument described suffers from two essential drawbacks, the first being that the light from the reticle does not seem to come, in its entirely, from the plane of the reticle, and the second being that the light loss and thus the light weakening in the rod is relatively large. If the marksman is, for instance, in the shade and aims at a target lighted by the sun, no sighting mark is obtained.

A further disadvantage is that the length of the optical system will be relatively large since this length also includes the whole length of the glass rod and that the glass rod cannot be exploited in any manner other than as part of the light source proper.

Moreover, it is previously known from Swedish Pat. application No. 12 736/71 to provide a lens serving as a semi-transparent concave mirror, and a light source placed in the focus of the mirror, said parts being so arranged that the main axis of the lens/mirror constitutes an axis of symmetry for the marksman's line of sight and a line between the light source and the centre of the lens. This device involves int.al. the improvement that the light viewed in the mirror seems to come from a single plane, whereby the picture of the light source, which is seemingly at a great distance in front of the mirror, can be concentrated in a better way than in the device described above. However, in this case as in the device described above a certain perturbation of the image is caused by refractions in the two sides of the lens (double image) at a small focal distance.

The present invention has for its object to overcome these problems and to this end the optical sighting instrument according to the invention includes a monolithic or composite body shielded at the circumference and made of glass or optically equivalent material, which body has at its front end a concave surface of refraction facing the rear end of the body and forming a semi-transparent concave mirror surface, and the light source is arranged in conjunction with said body at a light admission surface situated at the rear end of the body or between said end and the mirror surface, being located laterally of and at a distance from a line of sight which extends through the body from the rear to the front end thereof through the mirror surface.

According to the invention, the inner total reflection of light from a light source is exploited in an effective way with the smallest possible light loss, and image perturbation is diminished in that the light rays need not travel in the air between the lens/mirror and the light source. The light source can be built into the lens proper.

In the simplest case the trajectory of rays in the optical system takes place in one and the same medium, i.e., through a body of uniform material, such as glass or equivalent plastic, but the body may also be constructed from two or more pieces of material which are interconnected by any one of the methods well-known in optics. In the latter case, the body may be a glass rod and a ground lens fixed to one or both ends of the rod.

Normally, the optical system may be so arranged as to be neither magnifying nor diminishing, but the invention also permits arranging the optical system in such a way that it gives a magnification and thus can replace a telescope sight.

Owing to the insignificant loss of light in the optical system according to the invention (inner total reflection) it is possible to use relatively weak light sources. This means that the energy sources (generally batteries) will have a long life, and the use of so-called beta light, of the kind employed in night sights, as a light source in the sighting instrument according to the invention, is highly advantageous. A beta light of this type is made up of a glass capsule which is coated internally with, for instance, phosphorus and is filled with an activating gas such as tritium gas. Tritium which is an isotope of hydrogen, emits beta particles (electrones) which, when they strike phosphorus, cause this material to emit light of the colour characteristic of phosphorus. These light sources do not emit any harmful radiation, they can be made shock- and vibration-proof and completely protected against damage from external sources. Moreover, they can be very small in size, having for example diameters of from abt. ½ mm and more and lengths from abt. 5 mm and more, depending upon the light intensity desired.

In target shooting, with for instance air pistols, when shooting is carried out at a fixed distance (10 meters), it is possible to eliminate, when the light source is located in focus, such errors as arise by parallel displacements of the sighting mark when the observer moves his eye. This elimination is realized by moving the light source closer to the mirror, i.e., inside the focus, in proportion to the decreasing range to the target. The sighting mark will lie absolutely immovable on the target even if the observer moves high eye considerably.

By arranging the light source in such a way that the light directed towards the mirror seems to come from a single point or surface, the correct location of the light source in or relative to the focus of the mirror is easily determined, since the theoretical centre of the light source coincides with that of the light-emitting surface.

When a light source in the form of a glass rod with silvered ends and with an aperture (reticle) in one silvered end is used, a correct image of the reticle is only obtained if the sighting mark is observed in the middle of the mirror. A not insignificant portion of the total light comes from the silvered rear end of the rod, but if the observer moves his eye so that the sighting mark is observed at the edge of the mirror no light is obtained from the silvered rear surface, but only from that light which is reflected from the circumferential surface of the rod. When the observer moves his eye the light will thus vary in intensity and the sighting mark will be blurred (magnified).

The invention will be more fully described hereinbelow with reference to the accompanying drawing, in which:

FIG. 1 is a longitudinal sectional view of a sighting instrument according to the invention which is built into a tube;

FIG. 2, on a larger scale, is a longitudinal section of the light source at the sighting instrument in FIG. 1;

Figure 1:
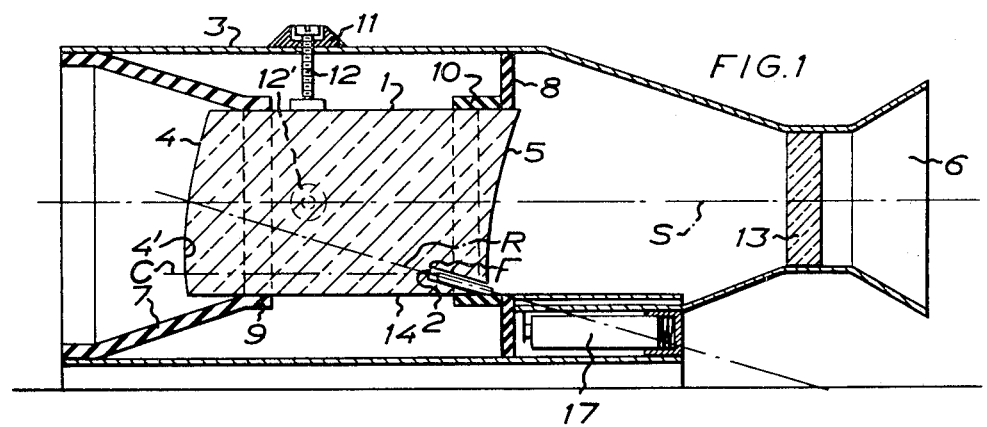

The main constituent parts of the sighting instrument illustrated in FIG. 1 comprise a lens 1 and a light source 2 disposed in a tube 3. The lens 1 is a cylindrical or rod-shaped body of ordinary lens glass, plexi glass or equivalent material. The front end surface 4 thereof is convex and the rear end surface 5 thereof is concave. The line R from the concave end surface 4 drawn through the crossing with a line of sight S through the lens from the rear end of the tube 3 at 6, said line of sight being parallel with the longitudinal axis of the lens, extends through the light source 2 which is mounted in a recess in the rear end portion of the lens near the circumferential surface thereof. The lens 1 is adjustably and elastically suspended together with the light source 2 in the tube 3 by means of rubber elements 7, 8, one of which is in the shape of a conical rubber sleeve 7 which at its inner narrow end is fastened about the lens 1 by means of a ring 9 and which at its outer end is fixed to the inner side of the tube 3 near the outer end thereof. The other rubber element 8 is in the form of a disk which at its inner periphery is clamped about the lens 1 by means of a ring 19 near the rear end of the lens, the outer edge of said ring being fixed to the inner side of the lens. A set screw 12 is screwed into a holder 11 on the tube wall and bears with its inner end against a shoulder on the circumferential surface of the lens at a point in front of the centre of the lens. The rod 1 can by swung by means of the set screw 12 in the plane of FIG. 1. A similar set screw 12' may be arranged in a position turned through 90° in relation to the set screw 12, for adjusting the front end of the lens 1 in a longitudinal axial plane at right angles to the plane of FIG. 1. The sighting aperture 6 at the rear end of the tube 3 may be designed in any suitable manner, for instance as a hopper-shaped mouth, as in a telescope sight. The tube is preferably closed at the outer end by means of a glass disk 13. The glass disk 13 may be replaced by an ocular, in which case the tube end 6 can be adjustable.

The outer end 4 of the rod 1, as already mentioned, is externally convex; the surface 4' serving as a mirror will then be concave. As shown, the axis R from the mirror surface makes an angle with the line of sight S through the tube 3, the focus of the mirror surface lying at the lower edge of the rear end of the lens 1, for instance slightly outside the point where the light source 2 is placed. Magnification is obtained if the rear concave end surface 5 of the lens 1 has a radius of curvature greater than the surface 4. The optical axis of the surface 5 is parallel with the axis R and the circumference of the lens is either matted or coated with a light-impermeable coating 14 of some suitable kind.

Figures 2, 3:
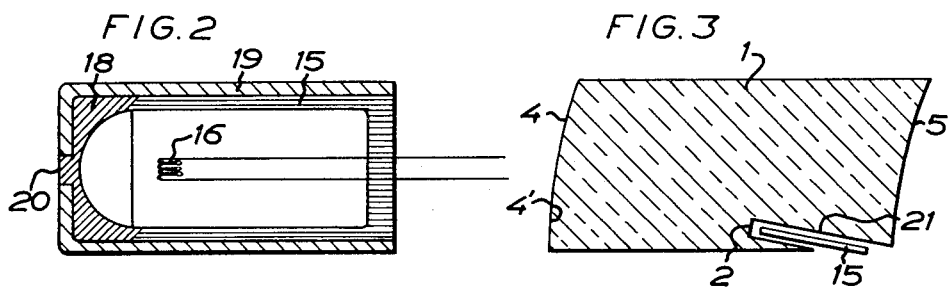
FIG. 3 is a diagrammatic side elevational view of the light transmitting body forming both the light transmission medium and the mirror/lens in the sighting instrument according to the invention.

As shown in FIGS. 1 and 2 the light is supplied to the light source at the sighting instrument in FIG. 1 by a small lamp 15, the filament 16 of which is connected to a battery 17 (see FIG. 1) and which is enclosed in a glass bed, for example, a bed of acrylic glass 18 which is cast into a brass sleeve 19. The front end of the brass sleeve has an aperture which is filled with glass forming a plug 20 the outer side of which is matted. The outer end of the glass plug 20 thus forms a matt, luminous surface which is directed to that point of the mirror surface 4' of the lens 1 which is passed by the line of sight S. As a result, a light spot coming from a single surface will be obtained. The front end portion of the brass sleeve 19 is preferably placed in a recess in the rear end of the rod (as appears from FIG. 1 and as diagrammatically shown in FIG. 3), but it can also be placed at the outer edge of the rear end of the lens 1.

It is also possible to provide a recess, in or near the rear end of the lens 1, which is shielded at the sides 21 (FIG. 3), which is matted at its bottom surface facing the middle of the mirror surface 4' (the point is cut by the line R in FIG. 1), and which constitutes the light source 2 in conjunction with the lamp 15 placed in the recess or sending its light into it.

The lens 1 can be ground so that it has neither magnifying nor diminishing properties, but should a magnification be desired (or diminution, which is less probable), this can easily be realized by suitable grinding of the surfaces 4, 5. The desired optical properties can be realized by grinding of the ends of a glass or plastic rod of suitable cross-section and length, or by the use of a combination of composite lenses, for instance two lenses 22, 23 at the ends of a plastic or glass rod 1' (FIG. 4).

Figure 4:
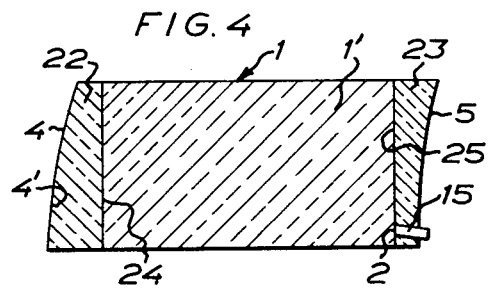
FIG. 4 is a view similar to FIG. 3 of a body of composite design.

In the embodiment according to FIG. 4 the rod 1' may consist of for example lens glass or plexi glass and can have straight or obliquely plane-ground ends 24, 25. In the case illustrated, the front lens 22 is a plane-convex lens and the rear lens 23 is a plane-concave lens. The mirror surface in this case is the rear 4' of the convex surface 4 of the plane-convex lens 22. The lamp 15 may be placed in the rear lens 23 or adjacent to it near the circumference thereof, or may extend with its front end through said lens up to the rear end 25 of the rod 1', i.e. the surface which, in its capacity as light-emitting surface has been called the light source 2.

If it is desired to change the location of the light source 2 relative to the focus of the mirror surface 4', the light source (for instance that shown in FIG. 2) may be displaceable and adjustable into desired positions along the axis R of the mirror.

Figure 5:
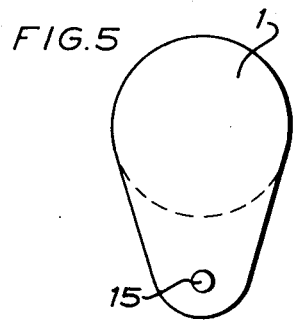
FIG. 5 is a view of a possible cross-sectional shape of the body at a level with the light source.

It should be observed that the lens 1 need not be circular-cylindrical. It may have, for instance, conical shape with circular cross-sectional form or may have any other suitable shape which will provide more space for the light source, for example the pear-shaped cross-sectional form illustrated in FIG. 5. Moreover, the rod 1' can be combined with lenses of any suitable configuration for obtaining the desired optical properties. The combination of a body of glass or equivalent material, such as the rod 1' in FIG. 4, and lenses, such as 22, 23, can be realized according to methods well-known in optics for avoiding perturbation phenomena and errors of refraction. Preferably, use can be made of Canada balsam (a resinous binder), to fix a lens at the end of a rod 1'. This balsam has the well-known property of permitting the bonding of well-ground lens surfaces without giving rise to undesired reflection.

In the sighting instrument according to the invention use is made of a rod (single or composite) of glass or equivalent light-permeable material both as a mirror and as a light ray trajectory and in certain cases also as a magnifying lens. The circumference of the rod is matted or otherwise shielded and the light penetrating through the rear end of the rod in the assembly according to FIG. 1 is insignificant relative to the light from the light source 2, and is not capable of blurring the sighting mark, i.e. the image of the light source situated in front of the sighting instrument.

Figure 6:
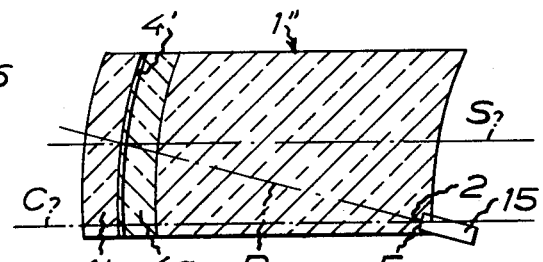
FIG. 6 is a modification of the lens systems in FIGS. 1, 3 and 4.

As shown in FIG. 6, it is conceivable to combine or to replace the rod 1 or 1' with a composite lens system comprising two assembled (e.g. glued together) lenses 4a, 4b, in which the boundary layer 4' between the lenses serves as a semi-transparent mirror for light from the light source. This can be realized by using lenses 4a, 4b of different indexes of refraction or by using a reflection layer between the lenses. A lens system combined according to this principle is neither magnifying nor diminishing. One lens 4a is formed so as to eliminate spherical abberation from the reflecting surface 4' between the two lenses 4a, 4b, while the other lens 4b is formed in such a way that the lens system 4a, 4b will be zero-refracting (neither magnifying nor diminishing) and will thereby compensate for the requisite deviation of the lens 4a from zero-refraction necessary for abberation correction. The trajectory, in the rod 1'', of the rays from the light source is advantageous also in this case, though not absolutely necessary to attain an absolutely parallax-free lens system which allows the observer to move his eye without resulting sighting errors.

In this case the rod 1'' may be omitted, whereby the lens 4a takes over the function of this rod 1''.

In a further modification, however, the lens 4a may be omitted, in which case the rod 1'' will be formed to eliminate spherical abberation from the reflecting surface 4' between the lens 4b and the lens formed by the rod 1'' in FIG. 6. Also in this case the lens 4b is formed such that the lens system 4b, 1'' will be zero-refracting, e.g. such that the lens 4b will compensate for the requisite deviation of the lens 1'' from zero-refraction.

In FIG. 6 (as in FIG. 1) the light source 15 is positioned such that the light emitting surface 2 is situated in the focus of the semi-transparent mirror surface 4', and such that the optical axis R of the light emitting surface 2 is situated between the line of sight S and a line between the light surface 2 and the centre point C of the lens system 4a, 4b; this point C is situated at or close to the lower edge of the lens system 4a, 4b (the lens system 4a, 4b is formed such that it may be considered cut from a sector of a symmetrical lens with the centre C in its middle point).

The light source, i.e. the luminous surface 2, may be in the form of a circular surface, a cross, a T or in any other suitable form normally used for sighting marks. The essential thing is that the light source is arranged in such a way that the light seemingly comes from one and the same surface which is planar or which may be curved, with all points of the luminous surface being equidistant from the mirror surface. The requirement that the image be sharp and the light loss as small as possible is satisfied with the embodiment according to the invention.

As mentioned in the introduction, use can be made, as a light-generating element, of so-called beta light comprising a glass capsule which is internally coated with, for instance, phosphorus and is filled with an activating gas such as tritium gas. A light-generating element of this type may be of very small dimensions and may therefore be easily mounted (exchangeably) in the glass body proper of the sighting instrument according to the invention. A light-generating element of this kind can be mounted for instance in the location of the lamp 15 in FIG. 4 and does not require any connections to a battery. A beta light is extremely well suited for shooting in the dark and is, besides, used for this purpose in conventional night sights.

Thus beta light has great advantages which can be exploited, in a novel manner, in the sighting instrument according to the invention but beta light also has the disadvantage that the light intensity cannot be varied as simply as in a battery-driven lamp, the light intensity of which can be varied by adjustment of a resistor. However, use can be made of relatively intensive beta light in combination with insertible or exchangeable filters for great or small subduing of the light intensity emitted.

In a preferred modification, use is made of a light source in the form of a light emitting diode 15, where the light source proper or, as shown, the outer end 2 of a rod 15' of a light leading material, such as acrylic plastic, is connected with the diode to serve as a light emitter. This light emitting diode or rod 15' may be arranged such that it will have a laser effect, e.g. such that the light beam from the light source to the surface 4' is sharply confined. Diodes of small dimensions and having the desirable characteristics mentioned above as well as the desirable characteristic of consuming very low electric power are — or are supposed in a near future to be — available on the market and are considered to be well suited for use as light sources in sighting instruments according to the invention.

Figure 7:
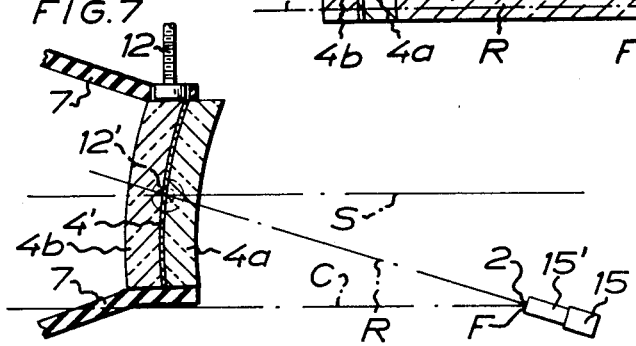
FIG. 7 is a simplification of the lens system in FIG. 6.

It will appear from the above that the primary parts of the sighting instrument according to the invention, i.e. the lens or lens assembly 1 having a semi-transparent mirror and the light source 2 can be modified in many ways, and that it is very simple to amount these parts of the compact sighting instrument adjustably in a housing of some kind, for instance the tube 3 shown in FIG. 1, especially when said parts 1, 2 are combined as shown in FIGS. 1, 3, 5 and 6 but also when these parts 1, 2 are spaced from each other as in the modification explained in conjunction with the description of FIG. 6. It is also pointed out, and shown in FIG. 7, that the centre C of the lens system may be situated at a point outwardly of the periphery of the lenses proper, e.g. spaced downwardly from the lower edge of the lenses as in FIG. 7, where reference numerals identical with those in FIGS. 1, 4 and 6 stand for identical or substantially equivalent parts. The lenses in FIG. 7 as in FIGS. 1, 3, 4 and 6 are supposed to be cut from symmetrical lenses, having a centre C in the middle point, in an area between the periphery thereof and a line which is a tangent to said periphery and is spaced from the centre of said supposed symmetrical lens. Also in this case any beam R from the light emitting surface 2 to the reflecting surface 4' will be reflected back as a light beam along or parallel with the sight line S and with the beam or line R situated between the line S (or any beam parallel therewith) and a line extending from the light emitting surface 2 to the lens centre C (which may be situated at or near or even outwardly of the lower edge of the lens or lens system). Under these circumstances a very quick aiming of a weapon equipped with the instrument according to this invention will be possible. As soon as the user's eye sees the sighting mark on the target the sighting mark will be coincident with the point of impact of the weapon without any parallax.

What I claim as new and desire to secure by Letters Patent is:

1. A sighting instrument having front and rear ends and comprising a lens means mounted at said front end of the instrument and including a semi-transparent concave mirror surface facing said rear end of the instrument to be viewed therefrom and having its axis directed such that the focus of said concave mirror surface is offset from the sighting line of said instrument, and a light source having a light emitting surface positioned substantially at the focus of said concave mirror surface for directing light onto said concave mirror surface to produce a confined image of said light emitting surface, which is useful as a sighting mark and which to an observer who has his eye directed to said mirror surface in a distance rearwardly thereof, appears to lie in front of the mirror on the sighting line between the observer's eye and a target, said lens means with said concave mirror surface and said light source being arranged such in relation to each other and to said sighting line that the main axis of light emitted from said light emitting surface intersects said sighting line substantially on said semi-transparent mirror surface and intersects the theoretical optical main axis of said lens means in a point close to the focus of the concave side of the mirror surface, wherein said lens means comprises a front lens and a rear lens with said semi-transparent mirror surface arranged between said lenses, said rear lens being formed to eliminate spherical aberration from the reflecting semi-transparent mirror surface between said lenses and said front lens being formed such that the lens system will be zero-refracting, and wherein said light source placed substantially at the focus of said mirror comprises a light emitting diode adjustably movable in relation to said focus and a body of optical material extending from the front end of said diode and providing with its front end said light emitting surface of a configuration to produce said confined image useful as a sighting mark.

2. An instrument as claimed in claim 1, wherein said lens means is so designed that its theoretical optical axis is spaced from and parallel with said sighting line.

3. An instrument as claimed in claim 1, wherein said lens means comprises a body of optic material extending from said light emitting surface and wherein said light emitting surface is provided in a recess in said body.

4. An instrument as claimed in claim 1 wherein the light emitting surface is a matted surface.

5. An instrument as claimed in claim 1, wherein said light emitting surface is an end surface on an elongated body having a light leading capacity of the linear characteristic of acrylic plastic.

6. An instrument as claimed in claim 1, wherein a body of acrylic plastic extends from said light emitting surface to said lens means.

7. An instrument as claimed in claim 1, wherein the rear end of the lens means is of a shape substantially corresponding to that of the mirror surface, and has an axis parallel to that of the mirror surface.

8. An instrument as claimed in claim 7, wherein a body of optic material is fixed at the rear end of said front lens to serve as said rear lens.

9. An instrument as claimed in claim 1, wherein said lens means comprises a rod-shaped body of optic material which together with the lens means constitutes a unit extending rearwardly to and contacting said light emitting surface.

10. An instrument as claimed in claim 9, wherein said light source is at least partially mounted in a rear end portion of said body.

11. An instrument as claimed in claim 9, wherein said body in its rear end portion has a cylindrical recess having a bottom surface and an axis directed to the mirror and extending at right angles through said bottom surface and wherein said light emitting surface is positioned close to said bottom surface.

12. An instrument as claimed in claim 1, wherein said light source is a light source having a laser effect.

13. An instrument as claimed in claim 1, wherein said lens means and said light source are adjustably mounted and elastically suspended in a tube of substantially the same shape and configuration as that of a telescope sight.

14. A sighting instrument having front and rear ends and including a lens means mounted at said front end of the instrument and including a semi-transparent concave mirror surface facing said rear end of the instrument to be viewed therefrom and having its axis directed such that the focus of said concave mirror surface is offset from the sighting line of said instrument, and a light source having a light emitting surface positioned substantially at the focus of said concave mirror surface for directing light onto said concave mirror surface to produce a confined image of said light emitting surface, which is useful as a sighting mark and which to an observer who has his eye directed to said mirror surface in a distance rearwardly thereof, appears to lie in front of the mirror on the sighting line between the observer's eye and a target, said lens means with said concave mirror surface and said light source being arranged such in relation to each other and to said sighting line that the main axis of light emitted from said light emitting surface intersects said sighting line substantially on said semi-transparent mirror surface and intersects the theoretical optical main axis of said means in a point close to the focus of the concave side of the mirror surface, wherein said lens means includes a front lens and a rear lens with said semi-transparent mirror surface arranged between said lenses, said rear lens being formed to eliminate spherical aberration from the relecting semi-transparent mirror surface between said lenses and said front lens being formed such that the lens system will be zero-refracting, and wherein said light source comprises a capsule containing a medium emitting beta particles and a substance arranged to receive and adapted to be activated by said particles to emit a light characteristic of the substance in question, said capsule having a front end closed by optic material the front end of which provides said light emitting surface of a configuration to produce said confined image useful as a sighting mark.

15. An instrument as claimed in claim 14, wherein said medium being tritium gas and said substance being phosphorus.

* * * * *